(12) United States Patent
Brown et al.

(10) Patent No.: US 12,071,995 B2
(45) Date of Patent: Aug. 27, 2024

(54) TORQUE LIMITING COUPLER FOR AN ELECTRIC MOTOR SHAFT

(71) Applicant: BorgWarner Inc., Auburn Hills, MI (US)

(72) Inventors: Daniel Brown, Freeville, NY (US); Shawn Blackmur, Brooktondale, NY (US); Michael Close, Apalachin, NY (US)

(73) Assignee: BorgWarner Inc., Auburn Hills, MI (US)

( * ) Notice: Subject to any disclaimer, the term of this patent is extended or adjusted under 35 U.S.C. 154(b) by 734 days.

(21) Appl. No.: 17/260,380

(22) PCT Filed: Jul. 19, 2019

(86) PCT No.: PCT/US2019/042583
§ 371 (c)(1),
(2) Date: Jan. 14, 2021

(87) PCT Pub. No.: WO2020/023304
PCT Pub. Date: Jan. 30, 2020

(65) Prior Publication Data
US 2021/0293285 A1 Sep. 23, 2021

Related U.S. Application Data

(60) Provisional application No. 62/702,605, filed on Jul. 24, 2018.

(51) Int. Cl.
*F16D 7/04* (2006.01)
*H02K 7/00* (2006.01)

(52) U.S. Cl.
CPC ............. *F16D 7/048* (2013.01); *H02K 7/003* (2013.01)

(58) Field of Classification Search
CPC .... F01L 1/344; F01L 9/20; F16D 7/00; F16D 7/002; F16D 7/021; F16D 7/022;
(Continued)

(56) References Cited

U.S. PATENT DOCUMENTS 2,143,710 A * 1/1939 Murray ................... F16D 35/00
475/94
2,826,903 A * 3/1958 Gerstung ................ F16D 7/048
464/37
(Continued)

FOREIGN PATENT DOCUMENTS

CN 101956800 A 1/2011
CN 107816453 A 3/2018
(Continued)

OTHER PUBLICATIONS

Chinese Office Action for Chinese Application No. 201980043035.4 dated May 26, 2023 (13 pages).
(Continued)

*Primary Examiner* — Josh Skroupa
(74) *Attorney, Agent, or Firm* — Reising Ethington P.C.

(57) ABSTRACT

A torque-limiting coupler for connecting an electric motor to a rotatable input of a vehicle is provided, including: a rigid frame that is configured to be coupled to one of the rotatable input or an output shaft of the electric motor; and an elastic member, configured to engage the other of the rotatable input or the output shaft of the electric motor, that engages the rigid frame such that the elastic member substantially maintains its shape and inhibits angular displacement between the rotatable input and the output shaft when an amount of torque received from the output shaft is below a predetermined torque limit, the elastic member changes shape permitting angular displacement between the rotatable input and the output shaft when an amount of torque
(Continued)

received from the output shaft exceeds the predetermined torque limit.

11 Claims, 9 Drawing Sheets

(58) Field of Classification Search
CPC .... F16D 7/048; F16D 43/2028; F16D 43/211; H02K 7/033; H02K 7/1815
USPC .............................................. 464/30, 37, 40
See application file for complete search history.

(56) References Cited

U.S. PATENT DOCUMENTS

| | | | | |
|---|---|---|---|---|
| 2,854,830 | A | * | 10/1958 | Steinbrecker ........... F16D 7/048 464/37 |
| 3,347,062 | A | * | 10/1967 | Schumann .............. F16D 7/048 464/37 |
| 3,835,544 | A | * | 9/1974 | Schneider ................ G01B 3/20 D10/73 |
| 4,056,953 | A | | 11/1977 | Furlette et al. |
| 4,610,340 | A | * | 9/1986 | Helmes ................... F16D 7/048 464/35 |
| 4,687,392 | A | | 8/1987 | Bidwell |
| 5,522,666 | A | * | 6/1996 | Tanaka .................... F16D 7/021 384/125 |
| 5,779,016 | A | * | 7/1998 | Kawasaki ............... F16D 7/022 464/40 |
| 6,116,579 | A | * | 9/2000 | Aldridge ................. F16D 7/048 464/30 |
| 6,443,846 | B1 | | 9/2002 | Dziedzic et al. |
| 7,533,474 | B2 | * | 5/2009 | Saito ....................... F16D 7/048 33/783 |
| 8,083,596 | B1 | | 12/2011 | Silver et al. |
| 8,313,384 | B2 | * | 11/2012 | Yang ....................... F16D 7/021 464/37 |
| 9,810,108 | B2 | | 11/2017 | Pritchard et al. |
| 10,024,367 | B2 | | 7/2018 | Kim |
| 2005/0006832 | A1 | * | 1/2005 | Hoshi ..................... F16D 7/048 267/154 |

FOREIGN PATENT DOCUMENTS

| | | | | |
|---|---|---|---|---|
| DE | 3335729 | A1 | * 4/1985 | ............. F16D 7/048 |
| DE | 102005001709 | A1 | * 8/2006 | ............. F16D 7/048 |
| FR | 979068 | A | * 4/1951 | ............... F16D 7/00 |
| FR | 2466666 | A1 | * 4/1981 | ............. F16D 7/048 |
| JP | 59197621 | A | * 11/1984 | ............... F16D 7/00 |
| JP | 60241533 | A | * 11/1985 | ......... F16D 43/2028 |
| JP | 2002266891 | A | * 9/2002 | ........... F16D 41/206 |
| WO | 2010-129539 | A2 | 11/2010 | |

OTHER PUBLICATIONS

English Translation of Chinese Office Action for Chinese Application No. 201980043035.4 dated May 26, 2023 (25 pages).
Chinese Office Action for Chinese Application No. 201980043035.4 dated Dec. 21, 2023 (13 pages).
English Translation of Chinese Office Action for Chinese Application No. 201980043035.4 dated Dec. 21, 2023 (27 pages).
Decision of Rejection for Chinese Application No. 201980043035.4 dated Mar. 29, 2024 (12 pages).
English Translation of Decision of Rejection for Chinese Application No. 201980043035.4 dated Mar. 29, 2024 (24 pages).

* cited by examiner

TORQUE LIMITING COUPLER FOR AN ELECTRIC MOTOR SHAFT

TECHNICAL FIELD

The present application relates to electric motor shaft couplers and, more particularly, to a torque limiting coupler for coupling an electric motor shaft to a rotatable input.

BACKGROUND

Vehicles can include electric motors that carry out a variety of vehicle functions, including, for example, adjusting the angular position of one or more camshafts with respect to the angular position of a crankshaft or adjusting the position of a passenger or driver seat. Electric motors can be used to operate a camshaft phaser such that the camshaft timing is advanced or retarded with respect to the crankshaft. The camshaft phaser may include stops that limit the range of authority of the camshaft phaser and, when the camshaft phaser reaches an end of the range, a relatively large amount of torque may be applied through the output shaft of the electric motor to the camshaft phaser. This relatively large amount of torque may cause unwanted stress to the camshaft phaser. Electric motors used in vehicle functions may be mounted in a way that introduces misalignment between the output shaft of the electric motor and the rotatable input of a vehicle.

SUMMARY

In one embodiment, a torque-limiting coupler for connecting an electric motor to a rotatable input of a vehicle is provided, including a rigid frame that is configured to be coupled to one of the rotatable input or an output shaft of the electric motor; and an elastic member, configured to engage the other of the rotatable input or the output shaft of the electric motor, that engages the rigid frame such that the elastic member substantially maintains its shape and inhibits angular displacement between the rotatable input and the output shaft when an amount of torque received from the output shaft is below a predetermined torque limit, the elastic member changes shape permitting angular displacement between the rotatable input and the output shaft when an amount of torque received from the output shaft exceeds the predetermined torque limit. The elastic member engages the rigid frame and the rotatable input or an output shaft of the electric motor in a way that accommodates misalignment between the rotatable input and an output shaft of the electric motor.

In another embodiment, a torque-limiting coupler for connecting an electric motor to a rotatable input of a vehicle is provided, including an annular rigid frame, including a central axial bore and a plurality of elastic member receiving features, that is configured to be coupled to the rotatable input; and an elastic member, disposed within the central axial bore of the annular rigid frame and engaged to the annular rigid frame at each of the plurality of elastic member receiving features, including at least one shaft receiving portion that is configured to engage an output shaft of the electric motor, the torque-limiting coupler: maintains a fixed relationship between an angular position of the output shaft of the electric motor and an angular position of the rotatable input while an amount of torque received from the output shaft is at or below a predetermined torque limit and permits angular displacement between the rotatable input and the output shaft when the amount of torque applied to the output shaft exceeds the predetermined torque limit.

In yet another embodiment, a torque-limiting coupler for connecting an electric motor to a rotatable input of a vehicle is provided, including an annular rigid frame, including a central axial bore and a plurality of elastic member receiving features, that is configured to be coupled to the rotatable input; and an elastic member disposed within the central axial bore and engaged to the annular rigid frame at each of the plurality of elastic member receiving features, wherein the elastic member includes a plurality of shaft receiving portions that are each configured to engage a substantially spherical component of an output shaft of the electric motor, the torque-limiting coupler: maintains a fixed relationship between an angular position of the output shaft of the electric motor and an angular position of the rotatable input while an amount of torque is at or below a predetermined torque limit and permits angular displacement between the rotatable input and the output shaft when the amount of torque applied to the output shaft exceeds the predetermined torque limit.

DETAILED DESCRIPTION

Figure 1:
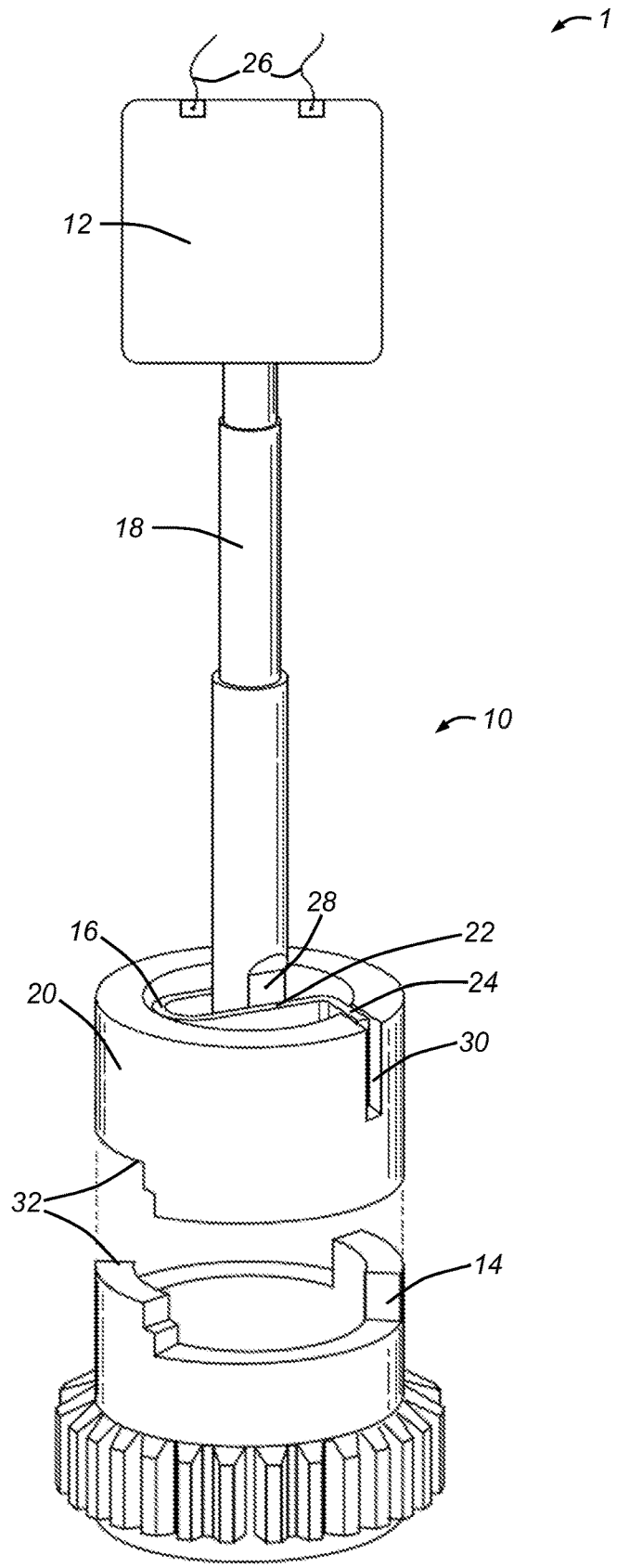
FIG. 1 is a perspective view depicting an implementation of a torque-limiting coupler system.

A torque limiting coupler limits an amount of torque applied by an output shaft of an electric motor to a rotatable input of a mechanical device. The torque-limiting coupler can include an elastic member that engages the output shaft of the electric motor and a frame that engages the rotatable input of the mechanical device. The torque-limiting coupler can connect the output shaft of the electric motor and the rotatable input such that the electric motor drives the rotatable input via the torque-limiting coupler. In one embodiment, the elastic member is semi-rigid and can fit within a bore of the frame of the torque-limiting coupler. The elastic member can be held in a coupled state by the frame, such as by an inner bore wall of the frame and/or elastic member receiving features of the frame. An inner bore of the frame receives the elastic member and it can be held there by receiving features on the frame. However, when the electric motor provides torque to the output shaft that rises above a predetermined value, the elastic member deforms and permits a change in angular position of the output shaft relative to the rotatable input of the mechanical device. The shape of the elastic member is substantially fixed while the torque applied by electric motor to output shaft and communicated to the mechanical device through the elastic member is below a predetermined value. However, when the torque rises above that predetermined value, the elastic member deforms thereby permitting the output shaft to change angular position relative to the mechanical device.

In some embodiments, the elastic member of the torque-limiting coupler can be fixedly coupled to the frame in a way that releasably engages the output shaft of the electric motor so that the torque-limiting coupler and the output shaft can rotate independently of one another when the torque limit is reached. And, in other embodiments, the torque-limiting coupler can releasably engage the rotatable input and can fixedly couple the output shaft of the electric motor so that the output shaft and the rotatable input can rotate independently of one another when the torque limit is reached. Once this torque limit is reached, the rotatable input can be angularly displaced with respect to the output shaft. The elastic member can ensure that the amount of torque applied to the rotatable input is limited to an amount below the torque limit.

For example, the elastic member of the torque-limiting coupler can include at least one shaft receiving portion that can releasably engage the output shaft of the electric motor, and can further include one or more frame engagement portions that can engage the frame of the torque-limiting coupler to resist angular displacement between the frame and the elastic member. In many embodiments, the torque-limiting coupler can be arranged so that the frame engagement portion(s) hold the elastic member fixedly with respect to the frame. Moreover, as mentioned above, when the torque reaches a predetermined torque level, the output shaft of the electric motor generates sufficient force to deform the elastic member thereby permitting the output shaft of the electric motor to rotate relative to the rotatable input. In one embodiment, the elastic member may engage the output shaft on opposing sides at elastic member engagement portion(s) that are configured to closely conform to the shape of the shaft receiving portions. When the predetermined torque level is reached, the elastic member is deformed by the output shaft such that the shaft receiving portion(s) are forced away from one another. The deformation of the elastic member causes the elastic member to disengage from the elastic member engagement portion(s) of the output shaft thereby allowing the output shaft to rotate independently of the elastic member, the frame, and, thus, the rotatable input.

With reference to FIG. 1, a torque-limiting coupler system 1 is shown and includes a torque-limiting coupler 10, an electric motor 12, and a rotatable input 14. The torque-limiting coupler 10 can include an elastic member 16, which can engage an output shaft 18 of the electric motor 12, and a frame 20, which can transmit torque from the elastic member 16 to the rotatable input 14. The torque-limiting coupler 10 can connect the output shaft 18 and the rotatable input 14 so that torque generated by the electric motor 12 can be used to rotate the rotatable input 14 via the output shaft 18. The torque-limiting coupler 10 can include at least one shaft receiving portion 22 that engages the output shaft 18. Moreover, the elastic member 16 of the torque-limiting coupler 10 can include at least one frame engagement portion 24 that is coupled to the frame 20 of the torque-limiting coupler 10 via elastic member receiving features 30 (only one shown). The elastic member receiving features 30 permit the elastic member 16 to move with respect to the frame 20 such that the frame engagement portion(s) 24 of the elastic member 16 slide radially in and out of the elastic member receiving features 30; however, in other embodiments, the elastic member receiving features may hold the elastic member with respect to the frame such that this radial movement is restricted. The torque-limiting coupler 10 limits torque delivered from the electric motor 12 to the rotatable input 14 through deformation of the elastic member 16 at least at the shaft receiving portion(s) 22 when the torque between the output shaft and the rotatable input 14 reaches the predetermined torque value or level (referred to herein as the "torque limit"). Once this torque limit is reached the rotatable input is angularly displaced with respect to the output shaft 18, the torque is still limited to a second predetermined limit (or second torque limit), which can be a torque value that is the same or different than the torque limit.

The particular configuration of the coupling between the elastic member 16 and the output shaft 18 at the shaft receiving portion(s) 22 can at least partially dictate the torque limit at which the slippage or decoupling is permitted. Thus, the torque-limiting coupler 10 can deliver torque between the electric motor 12 and the rotatable input 14 up to the torque limit. The torque limit can be adjusted through modification of the torque-limiting coupler system 1, such as by modifying the torque-limiting coupler system 1 in a way that changes the resilient forces of the elastic member 16 as applied to the output shaft 18 at the shaft receiving portion(s) 22. For example, the resiliency or spring properties of the elastic member 16 can be adjusted thereby resulting in a different torque limit.

The electric motor 12 can be any of a variety of motors that convert electric power into rotational force or mechanical energy. The electric motor 12 can be any of a variety of electric motors, stepper motors (or other brushless motors), including a mechanical-commutator motor, an electronic-commutator motor, an asynchronous motor, or a synchronous motor. Also, the electric motor 12 can be powered by either an alternating current (AC) source or a direct current (DC) source, including various types of batteries, electrical grids (e.g., 110V AC electrical grid), and other electric generators. In one embodiment, a battery can be used to deliver DC to the electric motor 12. The electric motor 12 can include electrical lead wires 26 that can be used for receiving electrical power. In at least one embodiment, the electric motor 12 can deliver torque of varying directions and magnitudes, which can be based on the amount of electrical power delivered to the electric motor 12.

In many embodiments, the electric motor 12 can include a stator, a rotor, and a housing (not shown). The stator can be integrated into the housing and can include windings or permanent magnets. The rotor can be positioned between opposing ends of the stator and can include windings or permanent magnets. The rotor can include the output shaft 18 or can be fixedly connected to the output shaft 18 such that the rotor and the output shaft 18 rotate together. The windings can include one or more wires (or electrically-conductive elements) that are looped around the respective part, such as the rotor and/or the stator. Electric current or power can be delivered to the windings from an electric power source, such as a battery or an electric generator. The output shaft 18 of the electric motor 12 can be cylindrical and can be rotated about a central axis running through the middle of the output shaft 18.

Figure 3:
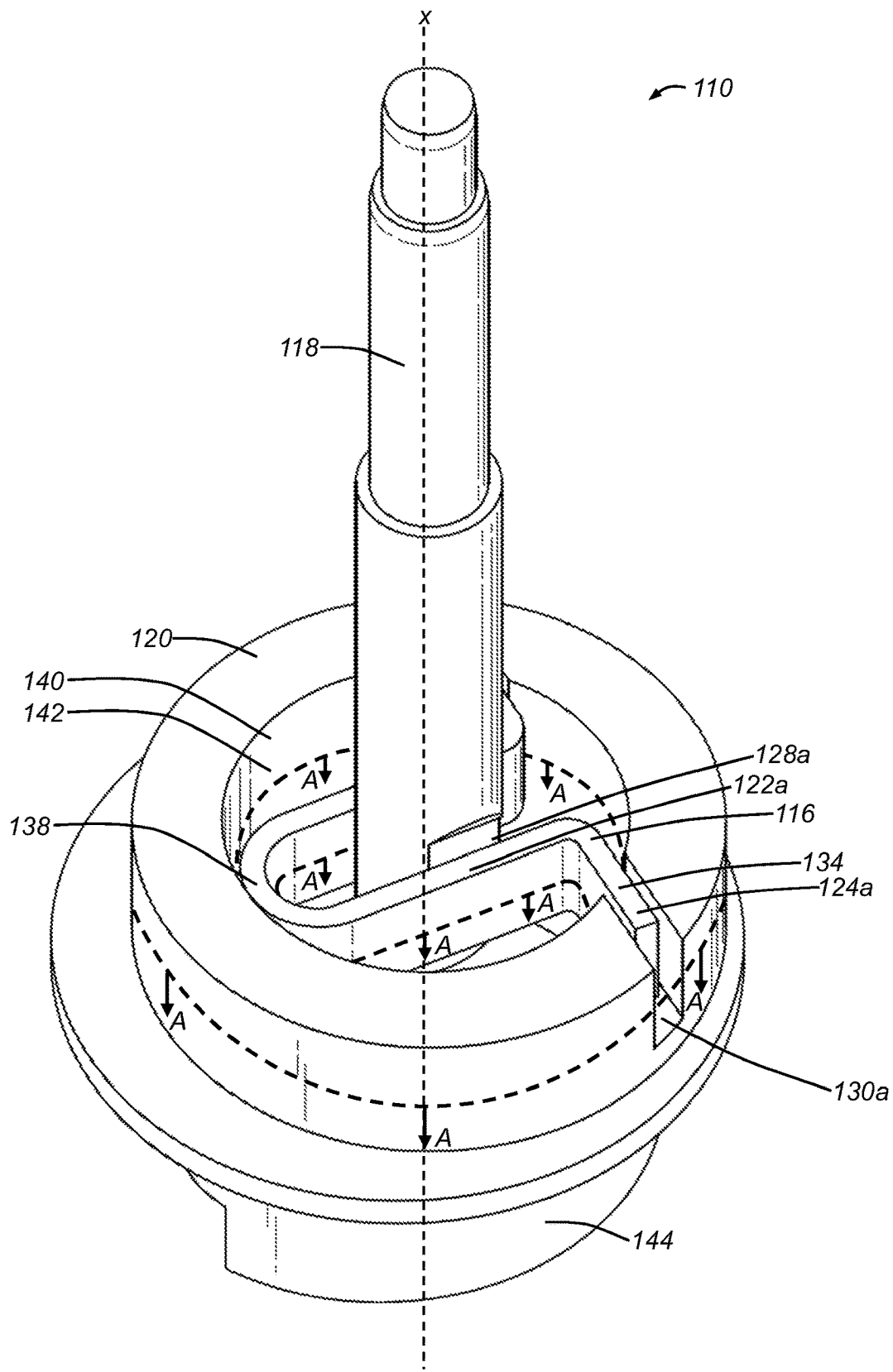
FIG. 3 is a perspective view depicting an implementation of a torque-limiting coupler.
Figure 4:
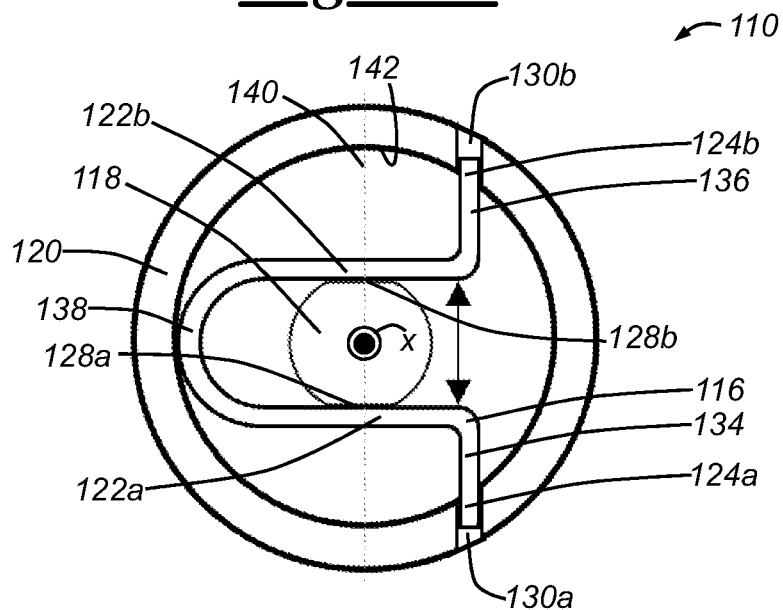
FIG. 4 is a cross-sectional profile view depicting an implementation of the embodiment of the torque-limiting coupler of FIG. 3 in a coupled state.

Additionally, the output shaft 18 can include one or more elastic member engagement portions 28 that each engage the shaft receiving portion(s) 22 of the elastic member 16 of the torque-limiting coupler 10. The number of elastic member engagement portions 28 of the output shaft 18 can correspond to the number of shaft receiving portion(s) 22 of the elastic member 16. The point or surface of contact between the shaft receiving portion(s) 22 of the elastic member 16 and the elastic member engagement portion(s) 28 when these two portions are operatively engaged to one another can be referred to as an output shaft coupler interface. In at least one embodiment, the elastic member engagement portion(s) 28 can each be a reduced-diameter portion of the output shaft 18, such as that which is shown in FIGS. 3 and 4. This reduced-diameter portion can be a notch feature, a flat on the shaft feature, a shaft with drive flat feature, a Weldon shank feature, or a D-cut feature. In other embodiments, the elastic member engagement portion(s) 28 can include other features that permit the elastic member 16 to releasably engage the output shaft 18. The elastic member engagement portion(s) 28 (e.g., reduced-diameter portion(s)) can be complementary in shape and size to the shaft receiving portion(s) 22 of the elastic member 16 and, in this embodiment, each include a relatively planar surface. However, in other embodiments, the shape and size of the elastic member engagement portion(s) 28 of the output shaft 18 can be varied depending on a variety of factors, such as the shape and size of the elastic member 16 at the shaft receiving portion(s) 22 and whether axial or radial misalignment between the output shaft 18 and the torque-limiting coupler 10 is desired, as will be discussed in more detail below. In at least one embodiment, the surface of the elastic member engagement portion(s) 28 can have a higher or lower coefficient of friction relative to the surface of other portions of the output shaft 18, and the coefficient of friction can be adjusted to obtain a desired torque limit. Adjusting the coefficient of friction of the elastic member engagement portion(s) 28 or the shaft receiving portion(s) 22 of the elastic member 16 can increase or decrease the torque limit of the torque-limiting coupler 10.

In one embodiment, the torque-limiting coupler 10 can include the elastic member 16 and the frame 20, each of which can be comprised of a unitary construction, such as that which is depicted in FIG. 1. For example, the elastic member 16 can be formed from a single strand of metal wire. However, in other embodiments, each of these parts 16, 20 of the torque-limiting coupler 10 can be comprised of a plurality of parts. The torque-limiting coupler 10 (and its components) can be made of variety of plastics, polymers, metals, and/or other suitable materials.

The elastic member 16 can be formed from any one of various metals or metal alloys, including a variety of steels. For example, elastic member 16 of the torque-limiting coupler 10 can be made of low-alloy Manganese steels, low-carbon steels, oil-tempered low-carbon alloys, chrome silicon alloys, chrome vanadium alloys, stainless steels, medium-carbon steels, high-carbon steels, and/or other spring steels. Other materials can be used as well, including nickel and titanium alloys. Moreover, the materials used for the elastic member 16 can affect the resiliency or elastic properties of the elastic member, which can change the torque limit between the output shaft 18 and the frame 20. Also, the shape, size, and other physical properties of the elastic member 16 can be selected based on the particular torque limit that is desired.

The frame 20 of the torque-limiting coupler 10 can be made of various types of rigid plastics or polymers, such as polyethylene, polyvinyl chloride (PVC), polypropylene (PP), polycarbonate (PC), acetal plastics (polyoxymethylene), acrylonitrile butadiene styrene (ABS), other thermoplastics, and various others. Or, in other embodiments, the frame 20 can be made of metals, such as those discussed above with respect to the elastic member 16. In many embodiments, the frame 20 is rigid and does not permit deformation during operation of the torque-limiting coupler 10. Also, the frame can be annular and, in such a case, can include a central axial bore, which can receive and include receiving features that hold the elastic member 16. The construction of the torque-limiting coupler 10, including its chemical makeup and shape, can be chosen to achieve desired properties of the torque-limiting coupler 10 or the torque-limiting coupler system 1, as will be discussed in more detail below.

The rotatable input 14 can be any device, component, or module that can be used to deliver rotational input to a mechanical device. The rotatable input 14 can be coupled with and engage the frame 20 at a coupler-input interface 32. The coupler-input interface 32 can enable the frame 20 to have fixed angular position with respect to the rotatable input 14 below a particular torque level. In this way, the frame 20, when operatively engaged to the rotatable input 14, rotates with the rotatable input 14 in a fixed manner thereby maintaining a fixed relationship between the angular position of the frame 20 and the angular position of the rotatable input 14.

As depicted in FIG. 1, the torque limiting coupler system 1 can be used with a camshaft phaser for a vehicle. In the embodiment of FIG. 1, the rotatable input 14 can be a component of the camshaft phaser for the vehicle and the electric motor 12 can be used to vary the angular position of one or more camshafts with respect to an angular position of a crankshaft of the vehicle. For example, the camshaft(s) can be advanced or retarded with respect to the crankshaft through use of the camshaft phaser.

A crankshaft can be coupled to one or more camshafts of the internal combustion engine (ICE) via an endless loop, such as a timing chain. The one or more camshafts can be used to open and close intake and exhaust valves of the ICE. Variable camshaft timing (VCT) implemented using camshaft phasers can be used to vary the phase between the camshaft(s) and the crankshaft of the vehicle, which can be desirable when the ICE is operated under varying conditions and at varying speeds. The electric motor 12 can be used to provide rotational input to the camshaft phaser, which can then be used to advance or retard the camshaft(s) relative to the crankshaft. The camshaft phaser can include a gearbox that uses rotational input from the crankshaft (typically, via a timing chain) and rotational input from the electric motor 12. In one embodiment, the rotatable input 14 can be a sun gear of a planetary gear assembly, such as the sun gear 22 of the planetary gear assembly 14 discussed in U.S. Pat. No. 9,810,108, which is incorporated herein by reference. In other embodiments, a different gearbox can be used, such as an electrically-actuated camshaft phaser that uses an eccentric shaft rotating a compound planet gear to advance or retard the camshaft(s) with respect to the crankshaft. For example, the torque-limiting coupler can be used with an eccentric camshaft phaser and, in such a case, may include different features or interfaces for use with the eccentric camshaft phaser or other rotatable input.

Moreover, some camshaft phasers may permit the camshaft(s) to be advanced or retarded within certain limits and, upon reaching one of these limits, a rotating member of the camshaft phaser may impact a stop or an end. When this occurred in the past, the amount of torque exerted by an electric motor, including inertial torque, on a rotatable input could exceed a desired torque limit in response to a hard impact of reaching the stop when the output shaft is rigidly attached to the rotatable input. The amount of torque applied by the electric motor to a rigidly connected rotatable input can cause damage and/or increased wear to the electric motor 12, the rotatable input 14, and/or the mechanical device. In contrast, use of the torque-limiting coupler 10 between the electric motor 12 and the rotatable input 14 can allow the output shaft 18 of the electric motor 12 to rotate independently of the frame 20 (and the rotatable input 14) when the torque limit is reached thereby limiting the amount of torque between the electric motor 12 and the rotatable input 14.

Figure 2:
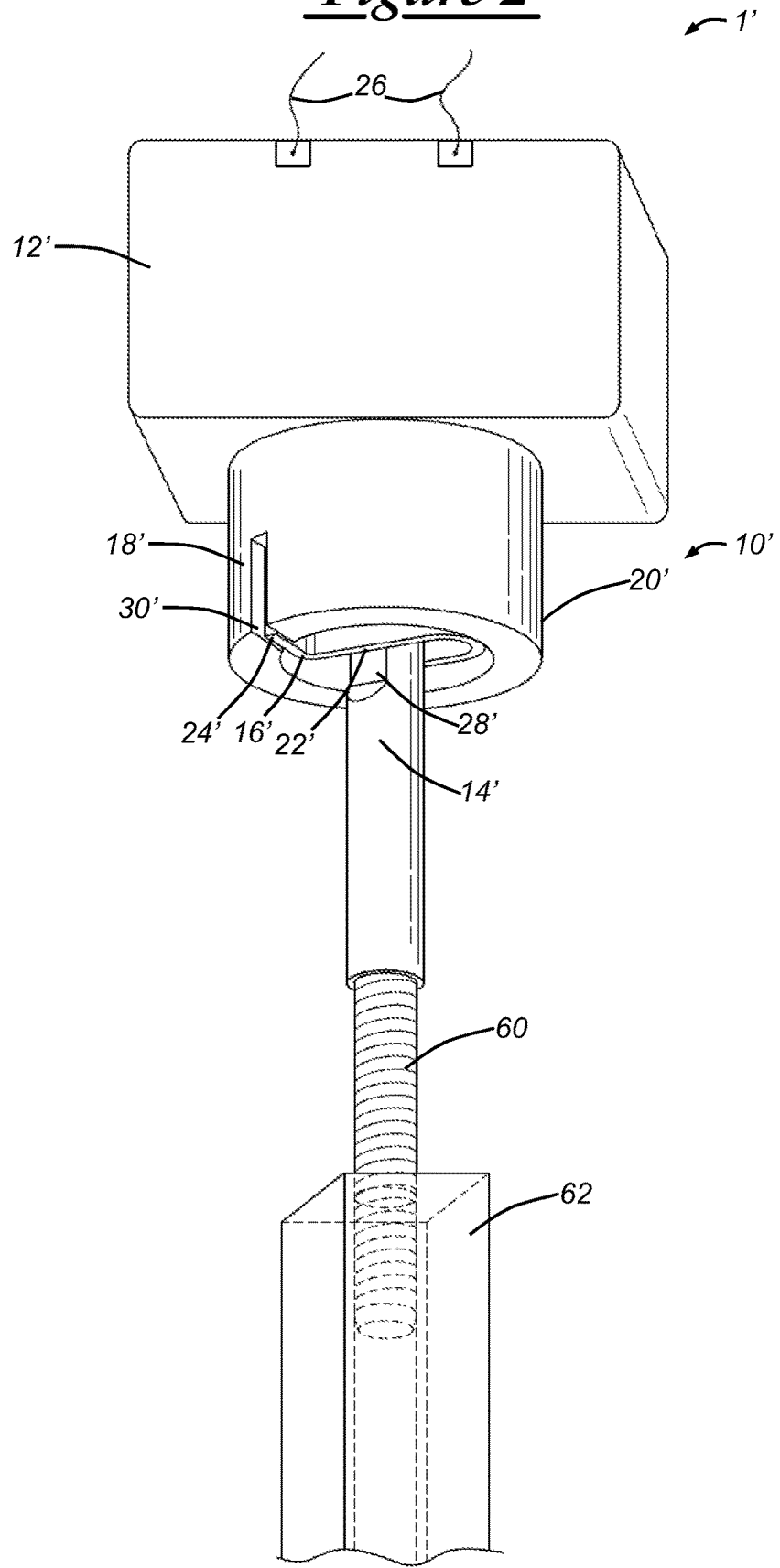
FIG. 2 is a perspective view depicting another implementation of a torque-limiting coupler system.

With reference to FIG. 2, there is shown another embodiment of a torque-limiting coupler system 1'. The torque-limiting coupler system 1' uses rotational force produced by the electric motor 12' to rotate the rotatable input 14' relative to a threaded bore. Thus, the electric motor 12' can be used to linearly move a housing 62 relative to the rotatable input 14'. This torque-limiting coupler system 1' can be used with a variety of implementations, such as an electrically-powered vehicle seat adjustment system that can adjust a component of a seat, such as the bed of the seat. The torque-limiting coupler system 1' can be integrated into other vehicle systems that employ an electric motor as well.

In the embodiment shown in FIG. 2, the frame 20' of the torque-limiting coupler 10' is attached to or integrated with an output shaft 18' of the electric motor 12'. The elastic member 16' fits within the frame 20' and engages the frame 20' at frame engagement portions 24' (only one shown). Moreover, the rotatable input 14' can engage the elastic member 16' of the torque-limiting coupler 10' at one or more shaft receiving portion(s) 22' (only one shown) and, in such an embodiment, the shaft of the rotatable input 14' can include one or more elastic member engagement portion(s) 28' (only one shown) that engages the shaft receiving portion 22' of the elastic member 16'. In this way, the shaft receiving portion 22' of the torque-limiting coupler 10' is releasably fixed to the rotatable input 14' and the frame 20' is fixedly coupled (e.g., by way of attachment or incorporation) to the output shaft 18' of the electric motor 12'. In this way, when the torque between the output shaft 18' of the electric motor 12' and the rotatable input 14' reaches the torque limit, the output shaft 18' and the torque-limiting coupler 10' can rotate independently of the rotatable input 14'.

During use, the electric motor 12' can be operated to rotate the rotatable input 14' and move the housing 62 in two directions along a linear path. For instance, the torque-limiting coupler system 1' can be used to move a vehicle seat forward and rearward relative to a vehicle steering wheel. If an object obstructed movement of the housing 62, the rotational force applied on the rotatable input 14' by the electric motor 12' may rise above a predetermined torque level. The output shaft 18' can rotate freely of the rotatable input 14' as described above.

With reference to FIGS. 3 through 10, there are shown a plurality of different embodiments of a torque-limiting coupler. Any of these embodiments of the torque-limiting coupler can be integrated into the torque-limiting coupler system 1 or the torque-limiting coupler system 1', although modifications may be desirable when doing so. Or, any of these embodiments can be included in other systems that are used to deliver torque from a rotatable output (e.g., electric motor, manual crank) to a rotatable input. In such embodiments, the torque limiting coupler can limit the amount of torque that is delivered between the electric motor and the rotatable input. The amount of torque that is delivered before the torque-limiting coupler slips, decouples, or otherwise limits the torque can be referred to as the "torque limit." The torque limit can be the maximum amount of torque that is deliverable from the electric motor to the rotatable input before the torque-limiting coupler disengages and permits relative rotation between the output shaft of the electric motor and the rotatable input.

With particular reference to FIG. 3, there is shown a torque-limiting coupler 110. The torque-limiting coupler 110 includes an elastic member 116 and a frame 120. The elastic member 116 includes a first end 134 and a second end 136 (FIG. 4), as well as a curved portion 138. The first end 134 and the second end 136 each include a frame engagement portion 124a, 124b (FIG. 4) that can each engage an elastic member receiving feature 130a, 130b (FIG. 4), such as a slot or bore, of the frame 120. As depicted, the frame engagement portions 124a, 124b of the elastic member 116 can be positioned at or near the first and second ends 134, 136 of the elastic member 116. The elastic member receiving features 130a, 130b hold the elastic member 116 with respect to the frame 120 to prevent angular displacement such that the elastic member 116 and the frame 120 rotate together. In the illustrated embodiment, the elastic member receiving features 130a, 130b each comprise a slot that includes three surfaces within the frame 120. In other embodiments, such as those described below, the elastic member receiving features can include one or more slot(s), bore(s), hole(s), clip(s), weldment(s), hook(s), axial-facing surface(s), radial-facing surface(s), and/or other features that can either fixedly or releasably hold the elastic member to the frame.

When the first and second ends 134, 136 are engaged in the slots 130a, 130b, the curved portion 138 of the elastic member 116 can abut an inner portion of the frame 120. In one embodiment, the inner portion can be an inner bore wall 142 of a central axial bore 140 of the frame 120. The curved portion 138 can consist of a semicircle with about an approximately 180° arc. The central axial bore 140 can be coaxial with the center axis x of the frame 120 and can include an inner axial bore wall 142 that is circular about the central axis x. Additionally, the frame 120 can include a mechanical coupling 144 that is used to apply the torque received from the electric motor 12 (FIG. 1) to the rotatable input 14. In one embodiment, the mechanical coupling 144 can include a gear, a screw, a sprocket, a cog, a pulley, a pinion, or a wheel. Or, the mechanical coupling can include one or more interface(s) or feature(s) that are configured to engage include a gear, a screw, a sprocket, a cog, a pulley, a pinion, or a wheel of the rotatable input 14. In a particular embodiment, the torque-limiting coupler 110 can be used with an eccentric camshaft phaser of a vehicle to advance or retard the angular position of one or more camshaft(s) relative to the angular position of a crankshaft.

The elastic member 116 can resist deformation as the first end 134 is moved relative to the second end 136. In this way, the elastic member 116 inhibits movement of the first shaft receiving portion 122a moving radially outward and away from the second shaft receiving portion 122b (FIG. 4) relative to the output shaft 118. Moreover, the resiliency of the elastic member 116 holds the shaft receiving portions 122a, 122b against the elastic member engagement portions 128a, 128b (FIG. 4) of the output shaft 118. However, when the torque applied by the output shaft 118 to the rotatable input 14 reaches and/or exceeds the torque limit, the output shaft 118 can rotate relative to the torque-limiting coupler 110 thereby causing the first end 134 to move away from the second end 136 of the elastic member 116.

And, in some embodiments, the axial length of the elastic member engagement portions 128a, 128b of the output shaft 118 can be longer than the shaft receiving portions 122a, 122b. The interface between the elastic member 116 and the output shaft 118 allows for axial misalignment between the output shaft 118 and the frame 120 while still permitting the output shaft 118 to engage the elastic member 116 at the shaft receiving portions 122a, 122b. Angular misalignment can occur when the output shaft 118 is positioned in a non-parallel relationship with the center axis of the torque-limiting coupler, which could be a center axis x of the central axial bore 140 or other operational axis of the torque-limiting coupler to which the output shaft 118 is intended to be coaxial with. In addition, the torque-limiting coupler 110 can allow axial misalignment of the output shaft 118 permitting the shaft 118 to be moved axially along the x axis toward and away from the elastic member 116 while still maintaining the coupling therebetween.

Additionally, the frame engagement portions 124a, 124b of the elastic member 116 can slide relative to the elastic member receiving features 130a, 130b of the frame 120. In this way, the torque-limiting coupler 110 can allow for radial misalignment between the output shaft 118 and the frame 120 (or rotatable input 14). Radial misalignment occurs when the output shaft 118 is radially displaced from the center axis of the frame 120 (or other operative location within the frame). The output shaft 118 can be radially displaced within the central axial bore 140 of the frame 120 while still maintaining the coupling therebetween via the elastic member 116. Moreover, in some embodiments, the resilient, elastic, and/or spring-like properties of the elastic member 116 can be adjusted to allow angular misalignment between the output shaft 118 and the frame 120 such that the torque-limiting coupler 110 can deliver torque from the output shaft 118 to the rotatable input 14 even when the output shaft 118 is angled relative to the center axis.

Figure 5:
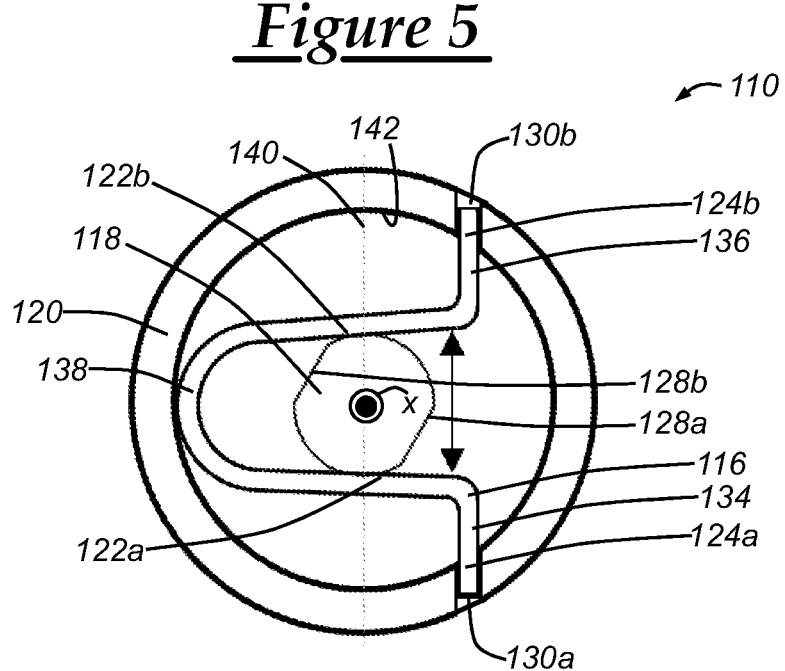
FIG. 5 is a cross-sectional profile view depicting an implementation of the embodiment of the torque-limiting coupler of FIG. 3 in a released state.

With reference to FIGS. 4 and 5, there is shown a cross-sectional view of the torque-limiting coupler 110 that is taken from section A-A (FIG. 3). FIG. 4 depicts the torque-limiting coupler 110 in a coupled state such that the shaft receiving portions 122a, 122b of the elastic member 116 engage the complementary surface of the elastic member engagement portions 128a, 128b of the output shaft 118. The output shaft 118 and the torque-limiting coupler 110 rotate together due to the coupling between the shaft receiving portions 122a, 122b and the elastic member engagement portions 128a, 128b of the output shaft 118. The curved portion 138 of the elastic member 116 can include a radius of curvature that is equal to half of the distance between the first elastic member engagement portion 128a and the second elastic member engagement portion 128b of the output shaft 118 when taken from cross-section A-A.

FIG. 5 depicts the torque-limiting coupler 110 in a released state such that the shaft receiving portions 122a, 122b of the elastic member 116 are not engaged with the complementary surface of the elastic member engagement portions 128a, 128b of the output shaft 118. When the torque between the output shaft 118 and the torque-limiting coupler 110 reaches and/or exceeds the torque limit, the output shaft 118 rotates relative to the torque-limiting coupler 110 thereby causing the first shaft receiving portion 122a of the elastic member 116 to move relative to the second shaft receiving portion 122b of the elastic member 116. As illustrated in FIGS. 4 and 5, the distance between the elastic member engagement portions 128a and 128b of the output shaft 118 is larger when the torque-limiting coupler is in the released state (FIG. 5) than when the torque-limiting coupler is in the coupled state (FIG. 4) since the torque of the output shaft 118 forces the shaft receiving portions outward with respect to the output shaft axis.

Figure 6:
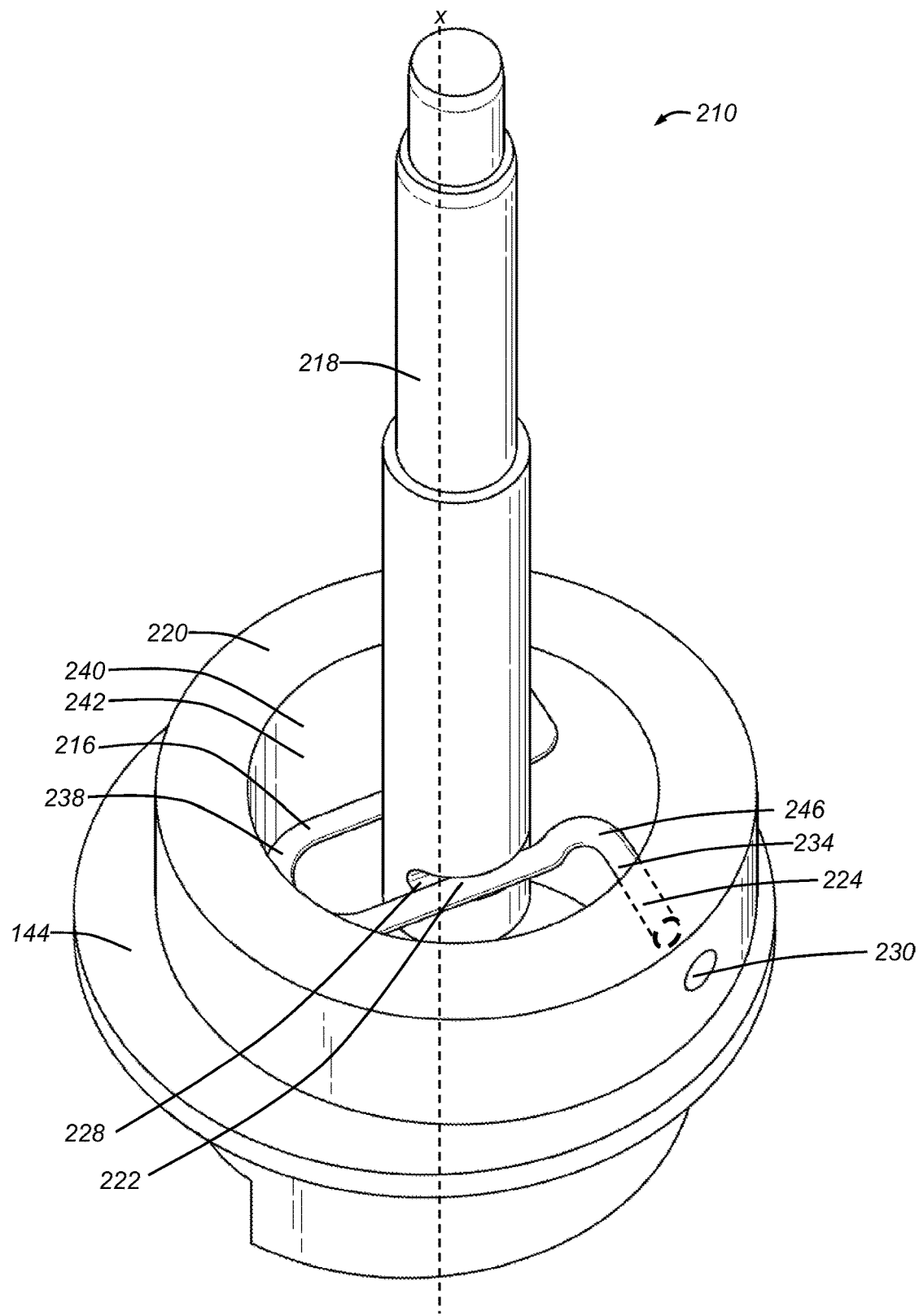
FIG. 6 is a perspective view depicting another implementation of a torque-limiting coupler.

With reference to FIG. 6, there is shown another embodiment of a torque-limiting coupler 210 that engages an output shaft 218, and the torque-limiting coupler 210 includes an elastic member 216 and a frame 220. The torque-limiting coupler 210 is similar in shape as that of the torque-limiting coupler 110. However, the elastic member 216 can be formed from a shaped section of elongated wire and, also, the shaft receiving portions 222 (only one shown) and the elastic member engagement portions 228 (only one shown) of the output shaft 218 have a reduced diameter relative to the rest of the shaft 218 and shaped to conform closely to the outside surface of the elastic member 216. The elastic member engagement portions 228 of the output shaft 218 can be transverse to the axis of shaft rotation. The frame engagement portions 224 (only one shown) and the elastic member receiving features 230 (only one shown) of the frame 220 can have a circular cross-section. However, any one of a number of other cross-sectional shapes are possible. The elastic member receiving features 230 (only one shown) of the frame 220 in this implementation are cylindrical bores that correspond to the cross-sectional area of the first end 234 of the elastic member 216, which itself has a circular or elliptical cross-section. The elastic member 216 also includes a curved portion 238 that abuts an inner bore wall 242 of an axial bore 240 of the frame 220. Additionally, the elastic member 216 includes curved portions 246 (only one shown) that are positioned between the respective shaft receiving portions 222 and the coupler engagement portions 228 of the output shaft 218. The torque-limiting coupler 210 functions similarly with respect to the torque-limiting coupler 110. For example, the torque-limiting coupler 210 can permit angular misalignment and radial misalignment in a similar fashion as the torque-limiting coupler 110.

Figure 7:
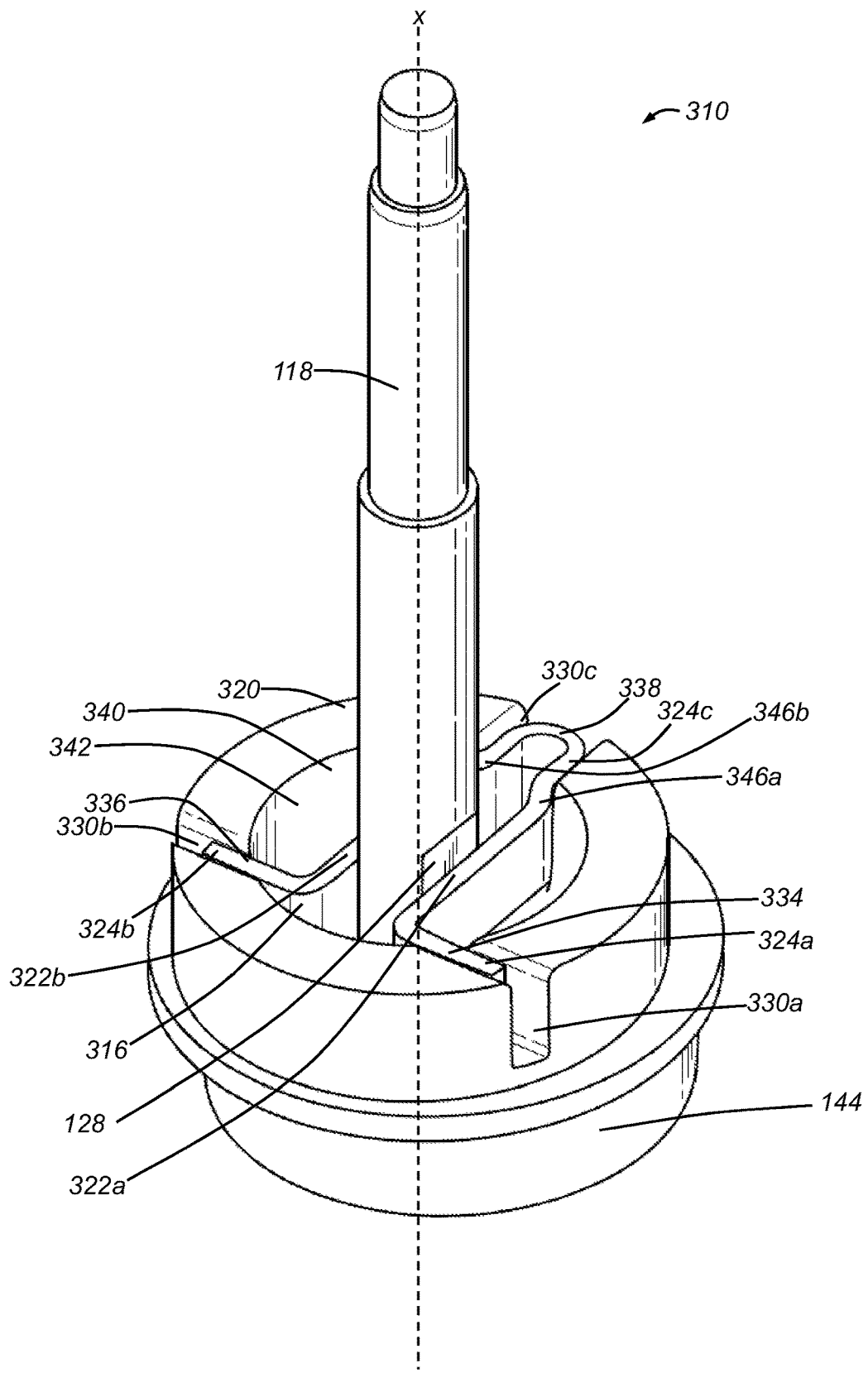
FIG. 7 is a perspective view depicting another implementation of a torque-limiting coupler.

With reference to FIG. 7, there is shown another embodiment of a torque-limiting coupler 310 that engages the output shaft 118, and the torque-limiting coupler 310 includes an elastic member 316 and a frame 320. The elastic member 316 is similar in shape to the elastic member 116 of FIG. 3, but includes a curved portion 338 that engages a third elastic member receiving feature 330c of the frame 320. A third frame engagement portion can be formed by the curved portion 338 and received by the third elastic member receiving feature 330c. Also, the frame engagement portions 324a, 324b are similar to those frame engagement portions 124a, 124b of the torque-limiting coupler 110 (FIG. 3), and these portions 324a, 324b engage first and second elastic member receiving features 330a, 330b of the frame 320. Additionally, the radius of curvature of the curved portion 338 can be less than the distance between the first shaft receiving portion 322a and the second shaft receiving portion 322b of the output shaft 318 when taken from an axial cross-section. In this embodiment, the curved portion 338 of the elastic member 316 does not engage an inner bore wall 342. The torque-limiting coupler 310 functions similar to the torque-limiting coupler 110 (FIG. 3). For example, the torque-limiting coupler 310 can permit angular misalignment, radial misalignment, and axial misalignment in a similar fashion as the torque-limiting coupler 110. Axial misalignment can occur when the output shaft 118 is axially displaced from the torque-limiting coupler 310 along the x axis such that the shaft receiving portion 322a, 322b move axially with respect to the elastic member engagement portions 128a, 128b. The torque-limiting coupler 310 can permit axial misalignment while still maintaining its functionality since the elastic member engagement portions 128a, 128b are axially longer (with respect to the center axis of the output shaft 118) than the width of the shaft receiving portions 322a, 322b of the elastic member 316. Thus, the output shaft can be adjusted axially while still maintaining the functionality of the torque-limiting coupler 310.

Figure 8:
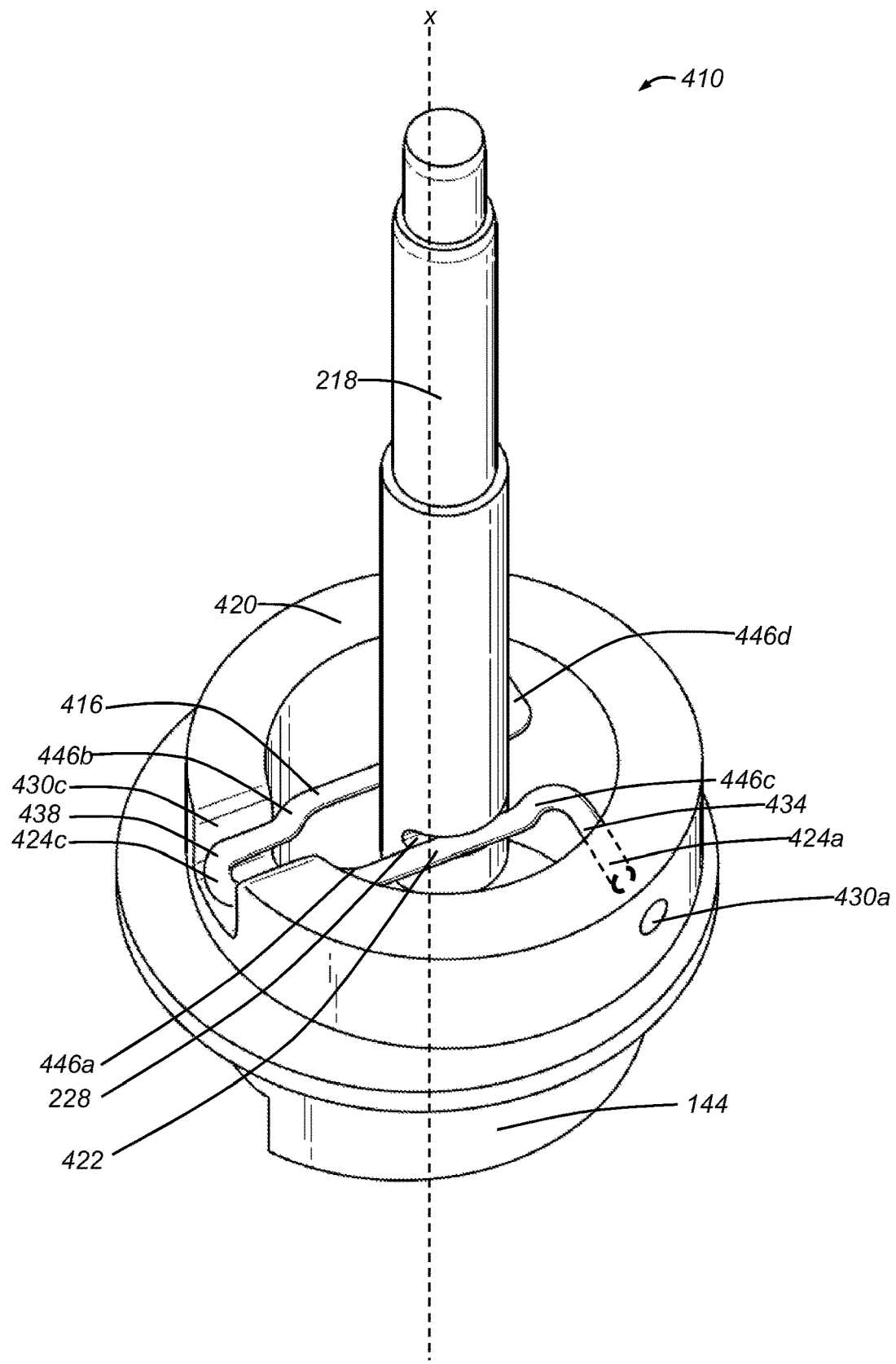
FIG. 8 is a perspective view depicting another implementation of a torque-limiting coupler.

With reference to FIG. 8, there is shown yet another embodiment of a torque-limiting coupler 410 that engages the output shaft 218, and the torque-limiting coupler 410 includes an elastic member 416 and a frame 420. The torque-limiting coupler 410 is similar in shape to the torque-limiting coupler 310 of FIG. 7, but the elastic member 416 can be formed as a shaped section of an elongated wire. The elastic member 416 includes three frame engagement portions 424 (only two shown: 424a, 424c), and the frame 420 includes three elastic member receiving features 430 (only two shown: 430a, 430c). The first and second elastic member receiving features 430a, 430b of the frame 420 engage the first end 434 and the second end (not shown) of the elastic member 416 at the first and second frame engagement portions 424. The third elastic member receiving feature 430c engages the third frame engagement portion 424c of the elastic member 416, which is located at the curved portion 438. The torque-limiting coupler 410 is shown as engaging the same output shaft 218 that the torque-limiting coupler 210 (FIG. 6) engages. The shaft receiving portions 422 (only one shown) of the elastic member 416 engage the output shaft 218 at the elastic member engagement portions 228 (only one shown) of the output shaft 218. Also, the elastic member 416 can include first and second bent portions 446a, 446b that are similar in nature to those of the elastic member 316, as well as third and fourth bent portions 446c, 446d that are similar in nature to those of the elastic member 216. The torque-limiting coupler 410 includes similar operational or functional properties as the torque-limiting coupler 210. For example, the torque-limiting coupler 410 can permit angular misalignment, radial misalignment, and axial misalignment in a similar fashion as the torque-limiting coupler 210.

Figure 9:
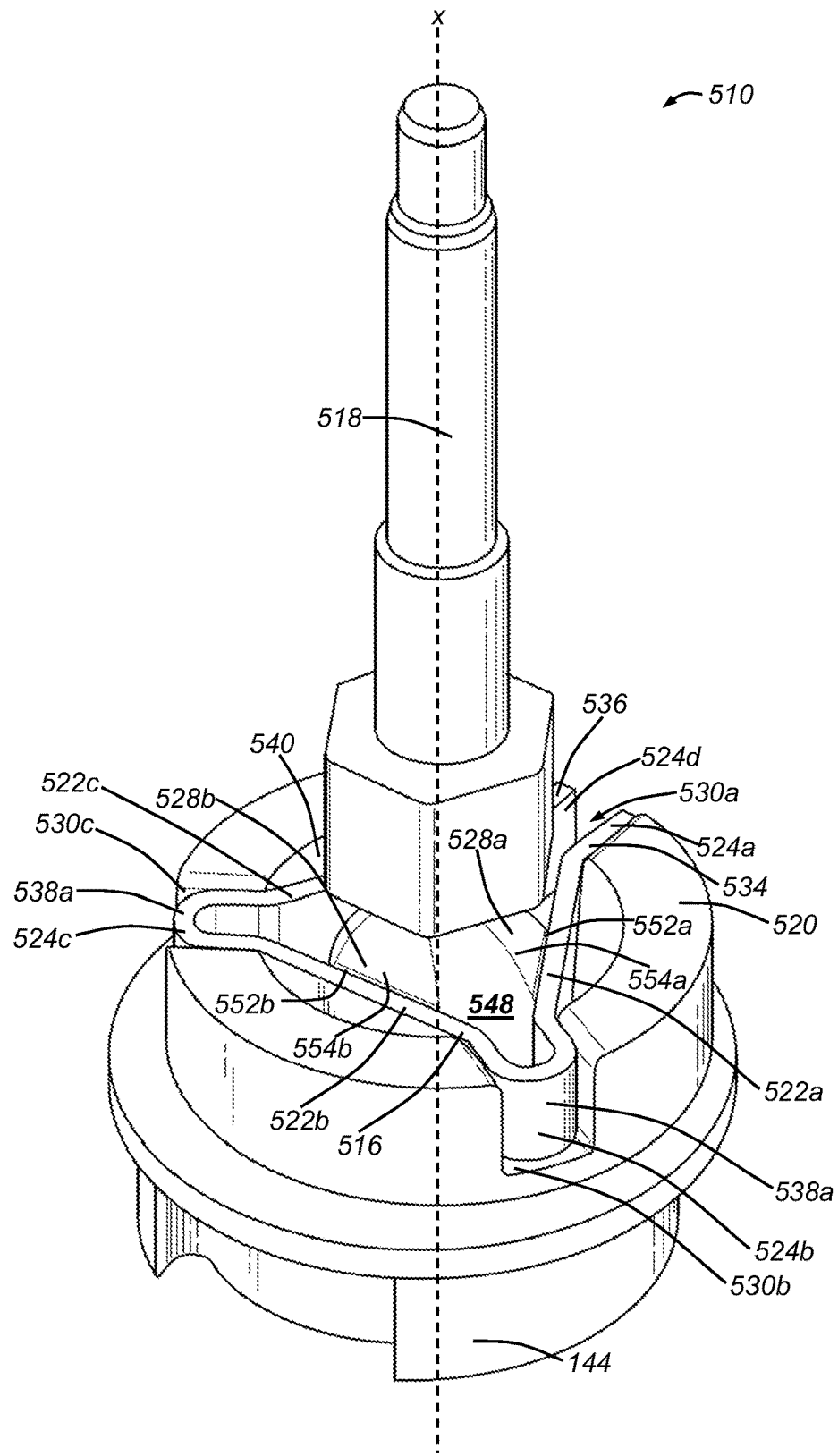
FIG. 9 is a perspective view depicting another implementation of a torque-limiting coupler.

With reference to FIG. 9, there is shown an embodiment of a torque-limiting coupler system 510 that engages an output shaft 518, and the torque-limiting coupler 510 includes an elastic member 516 and a frame 520. In one embodiment, the elastic member 516 engages a substantially spherical component 548 of the output shaft 518. The elastic member engagement portion(s) 528 can be included on a substantially spherical component 548 that is attached to one end of the output shaft 518. The elastic member 516 can include three shaft receiving portions 522a, 522b, 522c, as well as four frame engagement portions 524a, 524b, 524c, 524d that engage three elastic member receiving features 530a, 530b, 530c of the frame 520. When the torque provided by the output shaft 518 reaches the torque limit, the substantially spherical component 548 deforms the elastic member 516 at the shaft receiving portions 522, which permits the output shaft 518 to rotate independently of the torque-limiting coupler 510 and the rotatable input. This embodiment of the torque-limiting coupler 510 allows for axial and/or angular misalignment of the output shaft 518 and the frame 520 through use of the substantially spherical component 548 of the output shaft 518.

The elastic member receiving features 530a, 530b, 530c of the frame 520 can be positioned on the frame 520 with equal spacing between them. In one implementation, the elastic member receiving features 530a, 530b, 530c can be spaced at 120° between the center points of each elastic member receiving feature 530. Additionally, the elastic member 516 can include a first end 534 and a second end 536 that are positioned within the same elastic member receiving feature 530a of the frame 520. In this way, both of the frame engagement portions 524a and 524d corresponding to the first end 534 and the second end 536 of the elastic member 516 are disposed within a single elastic member receiving feature 530a of the frame 520. And, furthermore, the elastic member 516 can include two curved portions 538a, 538b that are disposed within the other elastic member receiving features 530b, 530c of the frame 520.

The torque-limiting coupler 510 can include three elastic member receiving portions 528 (only two shown: 528a, 528b) that engage the three shaft receiving portions 522a, 522b, 522c. In one embodiment, the three elastic member receiving portions 528 can each include a surface 552 (only two shown: 552a, 552b) that can be configured to complement the three shaft receiving portions 522a, 522b, 522c. The surfaces 552 can be flat or can be curved, such as at the same or a different radius of curvature than the rest of the substantially spherical component 548 and/or curved surfaces 554. For example, the surfaces 552 can be curved planes, flat two-dimensional surfaces, or some combination of the two. In some embodiments, the three elastic member receiving portions 528 can each further include a curved surface 554 (only two shown: 554a, 554b), which can be curved at the same radius of curvature as the rest of the substantially spherical component 548, or can include be curved at an increased or decreased radius of curvature relative to the rest of the substantially spherical component 548. Additionally, in some embodiments, the planar surfaces 552 may merge with the respective curved surfaces 554 and lack a defined boundary between them. The curved surfaces 554 can be configured in a particular manner to permit improved axial misalignment of the output shaft 518 relative to the torque-limiting coupler 510. For example, as the output shaft 518 is angled relative to the center axis (x) of the torque-limiting coupler, the curved portion 554a of the elastic member receiving portion 528a may engage the shaft receiving portion 522a while still maintaining a fixed relationship with respect to the angular position of the output shaft 518 and the torque-limiting coupler 510; however, when the torque limit is reached, the substantially spherical component 548 (and the output shaft 518) rotates independently of the torque-limiting coupler 510 due to the disengagement of the elastic member receiving portions 528 from the shaft receiving portions 522. The center axis (x) of the torque-limiting coupler can be a center axis of the central axial bore of the frame.

In another embodiment, the substantially spherical component 548 can be a single, universal shaft receiving portion 522 that does not include separate planar surfaces 552 or curved surfaces 554. For example, the points or surfaces of engagement between the substantially spherical component 548 and the shaft receiving portion(s) 522 can be uniformly spherical and can include the same radius of curvature throughout. In this way, the engagement of the output shaft 518 to the elastic member 16 can function as a universal or ball-jointed coupler thereby permitting axial misalignment while still permitting the delivery of torque from the output shaft 518 to the torque-limiting coupler 510.

Figure 10:
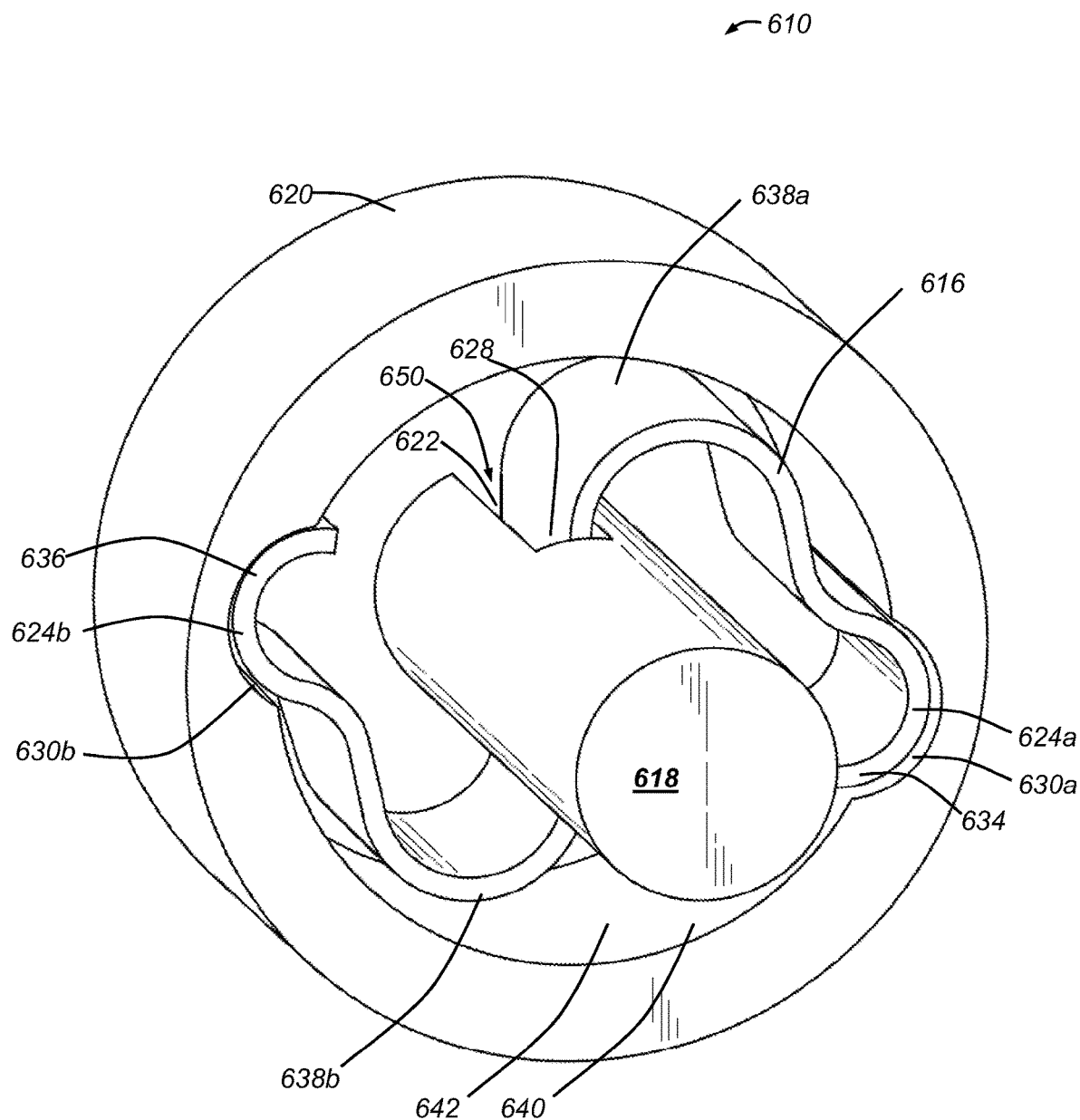
FIG. 10 is a perspective view depicting another implementation of a torque-limiting coupler.

With reference to FIG. 10, there is shown yet another embodiment of a torque-limiting coupler 610 engaged to an output shaft 618. The torque-limiting coupler 610 includes an elastic member 616 and a frame 620. The elastic member 616 includes two frame engagement portions 624a, 624b and a single shaft receiving portion 622. The two frame engagement portions 624a, 624b releasably engage elastic member receiving features 630a, 630b of the frame 620 and each of the two frame engagement portions 624a, 624b are curved so that the outside surface of each of the two frame engagement portions 624a, 624b fits in close conformity with the elastic member receiving features 630a, 630b. However, in some embodiments, a small amount of space can be left between these portions to allow the frame engagement portions 624a, 624b to more easily slide out of the elastic member receiving features 630a, 630b of the frame 620 such that frame engagement portions 624a, 624b abut an inner bore wall 642. The elastic member 616 also includes two curved portions 638a, 638b that are positioned between a respective end (e.g., the first end 634 or the second end 636) of the elastic member 616 and the shaft receiving portion 622. The radius of curvature of these curved portions 638a, 638b can dictate the torque limit at which the frame engagement portions 624a, 624b are forced out of the elastic member receiving features 630a, 630b of the frame 620, as explained in more detail below.

When the torque limit is reached, the frame engagement portions 624a, 624b are forced out of the elastic member receiving features 630a, 630b of the frame 620 such that the frame engagement portions 624a, 624b rest against the inner bore wall 642 of the frame 620 thereby allowing the output shaft 618 and the frame 620 to rotate independently of one another. Thus, when the torque limit is reached, there is sufficient torque between the output shaft 618 (which is fixedly attached to the elastic member 616) and the frame 620 such that the first end 634 and the second end 636 are forced toward the center axis of the frame 620 and out of the elastic member receiving features 630 of the frame 620. At this point, the first end 634 and the second end 636 of the elastic member 616 move to contact the inner bore wall 642 of the bore 640 and the elastic member 616 (and the output shaft 618) can rotate substantially freely of the frame 620 (and the rotatable input).

In one embodiment, the elastic member 616 is constructed as a single unitary structure. In such an embodiment, the shaft receiving portion 622 runs through the output shaft 618 and engages the elastic member receiving feature 628 of the output shaft 618. The shaft receiving portion 622 can engage the elastic member engagement portion 628 of the output shaft 618 within a bore 650 of the output shaft 618 and the size of the bore 650 can correspond to the cross-sectional area of the elastic member 616 as it runs through the bore 650 of the output shaft 618. In another embodiment, the elastic member 616 is constructed as multiple pieces or structures (i.e., a non-unitary construction). In such an embodiment, the elastic member 616 can comprise of two separate pieces that each include a shaft receiving portion 622. Moreover, these two separate pieces can be attached to the output shaft 618 at the outside circumference (or face) of the output shaft 618, or the two separate pieces may engage the output shaft 618 at respective bores 650 (only one shown).

The torque-limiting coupler 610 can permit axial misalignment since the frame engagement portions 624a, 624b and the elastic member receiving features 630a, 630b of the frame 620 are of sufficient length that, even when the frame 620 moves with respect to the elastic member 616, the frame engagement portions 624a, 624b and the elastic member receiving features 630a, 630b remain engaged to one another. And, in other embodiments, the torque-limiting coupler 610 may permit angular misalignment and/or radial misalignment through various other configurations and constructions of the components of the torque-limiting coupler 610.

Various other embodiments of a torque-limiting coupler, an output shaft, and a rotatable input exist, as those illustrated herein are merely meant to be examples of such devices and assemblies. Different shapes, sizes, configurations, and/or arrangements of such devices or assemblies can be used, while still enabling use of a torque-limiting coupler to translate torque from the output shaft of the electric motor to the rotatable input up to a torque limit.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

What is claimed is:

1. A torque-limiting coupler for connecting an electric motor to a rotatable input of an internal combustion engine, comprising:
   a rigid frame that includes a first elastic member receiving feature formed in the rigid frame and a second elastic member receiving feature formed in the rigid frame, the rigid frame is configured to be coupled to one of the rotatable input or an output shaft of the electric motor; and
   an elastic member, configured to engage the other of the rotatable input or the output shaft of the electric motor, that engages the rigid frame such that the elastic member substantially maintains its shape and inhibits angular displacement between the rotatable input and the output shaft when an amount of torque received from the output shaft is below a predetermined torque limit while also permitting angular misalignment and/or radial misalignment of the output shaft relative to the rotatable input,
   wherein the elastic member includes a first end that engages the first elastic member receiving feature so that the first end slides into and out of the first elastic member receiving feature, a second end that engages the second elastic member receiving feature so that the second end slides into and out of the second elastic member receiving feature, and a curved portion that abuts an inner portion of the rigid frame,
   wherein the elastic member changes shape permitting angular displacement between the rotatable input and the output shaft when an amount of torque transmitted between the rotatable input and the output shaft exceeds the predetermined torque limit, the first end of the elastic member moves away from the second end of the elastic member, and the first elastic member receiving feature and the second elastic member receiving feature positively an engage the first end of the elastic member and the second end of the elastic member to prevent movement of the elastic member relative to the rigid frame.

2. The torque-limiting coupler of claim 1, wherein the elastic member of the torque-limiting coupler comprises a unitary structure and wherein the rigid frame of the torque-limiting coupler comprises a unitary structure.

3. The torque-limiting coupler of claim 1, wherein a shaft receiving portion of the elastic member permits axial misalignment of the output shaft of the electric motor relative to the rotatable input.

4. The torque-limiting coupler of claim 1, wherein the rigid frame is fixedly attached to a mechanical input.

5. The torque-limiting coupler of claim 1, wherein the first end of the elastic member engages the first elastic receiving feature by a first frame engagement portion and the second end of the elastic member engages the second elastic receiving feature by a second frame engagement portion.

6. The torque-limiting coupler of claim 5, wherein the elastic member is formed from a section of elongated wire, wherein the first frame engagement portion engages a first slot within the rigid frame at the first elastic member receiving feature of the rigid frame, and wherein the second frame engagement portion engages a second slot within the rigid frame at the second elastic member receiving feature of the rigid frame where the elastic member can slide in a direction perpendicular to the central axis.

7. The torque-limiting coupler of claim 5, wherein the elastic member includes a first end corresponding to the first frame engagement portion and a second end corresponding to the second frame engagement portion, and wherein the first end engages the first elastic member receiving feature and the second end engages the second elastic member receiving feature of the rigid frame.

8. The torque-limiting coupler of claim 7, wherein the elastic member further comprises a curved portion disposed between the first end and the second end, and wherein the curved portion fits inside an inner bore wall of the rigid frame.

9. A torque-limiting coupler for connecting an electric motor to a rotatable input of an internal combustion engine, comprising:
an annular rigid frame, including a central axial bore and a first elastic member receiving feature formed in the rigid frame and a second elastic member receiving feature formed in the rigid frame that is configured to be coupled to the rotatable input; and
an elastic member, disposed within the central axial bore of the annular rigid frame and engaged to the annular rigid frame at the first elastic member receiving feature and the second elastic member receiving feature, including at least one shaft receiving portion that is configured to engage an output shaft of the electric motor and permit angular or radial misalignment of the output shaft relative to a center axis of the rotatable input,
wherein the elastic member includes a first end that engages the first elastic member receiving feature so that the first end slides into and out of the first elastic member receiving feature, a second end that engages the second elastic member receiving feature so that the second end slides into and out of the second elastic member receiving feature, and a curved portion that abuts an inner portion of the rigid frame,
wherein the torque-limiting coupler maintains a fixed relationship between an angular position of the output shaft of the electric motor and an angular position of the rotatable input while an amount of torque received from the output shaft is at or below a predetermined torque limit and permits angular displacement between the rotatable input and the output shaft when the amount of torque applied to the output shaft exceeds the predetermined torque limit, the first end of the elastic member moves away from the second end of the elastic member, and the first elastic receiving feature and the second elastic receiving feature positively engage the first end of the elastic member and the second end of the elastic member to prevent movement of the elastic member relative to the annular rigid frame.

10. The torque-limiting coupler of claim 9, wherein the first end of the elastic member corresponds to a first frame engagement portion and the second end of the elastic member corresponds to a second frame engagement portion, and wherein the first end of the elastic member engages the first elastic member receiving feature and the second end of the elastic member engages the second elastic member receiving feature of the rigid frame.

11. A torque-limiting coupler for connecting an electric motor to a rotatable input of a camshaft phaser of an internal combustion engine, comprising:
a rigid frame that includes a first elastic member receiving feature formed in the rigid frame and a second elastic member receiving feature formed in the rigid frame, the rigid frame is configured to be coupled to the rotatable input of the camshaft phaser or an output shaft of the electric motor; and
an elastic member, configured to engage the other of the rotatable input or the output shaft of the electric motor, that engages the rigid frame such that the elastic member substantially maintains its shape and inhibits angular displacement between the rotatable input of the camshaft phaser and the output shaft when an amount of torque received from the output shaft is below a predetermined torque limit while also permitting angular misalignment and/or radial misalignment of the output shaft relative to a center axis of the torque-limiting coupler,
wherein the elastic member includes a first end that engages the first elastic member receiving feature so that the first end slides into and out of the first elastic member receiving feature, a second end that engages the second elastic member receiving feature so that the second end slides into and out of the second elastic member receiving feature, and a curved portion that abuts an inner portion of the rigid frame,
wherein the elastic member changes shape permitting angular displacement between the rotatable input of the camshaft phaser and the output shaft when an amount of torque received from the output shaft exceeds the predetermined torque limit, the first end of the elastic member moves away from the second end of the elastic member, and the first elastic member receiving feature and the second elastic member receiving feature positively engage the first end of the elastic member and the second end of the elastic member to prevent movement of the elastic member relative to the rigid frame.

* * * * *